United States Patent
Lee et al.

(10) Patent No.: US 9,531,926 B2
(45) Date of Patent: Dec. 27, 2016

(54) PIEZOELECTRIC ACTUATOR FOR CAMERA MODULE

(71) Applicant: Apple Inc., Cupertino, CA (US)

(72) Inventors: Simon S. Lee, San Jose, CA (US); Qiang Yang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 14/551,387

(22) Filed: Nov. 24, 2014

(65) Prior Publication Data

US 2016/0147035 A1  May 26, 2016

(51) Int. Cl.
- *G02B 7/02* (2006.01)
- *H04N 5/225* (2006.01)
- *G02B 7/08* (2006.01)
- *H02N 2/00* (2006.01)

(52) U.S. Cl.
CPC .............. *H04N 5/2254* (2013.01); *G02B 7/08* (2013.01); *H02N 2/00* (2013.01); *H04N 5/2253* (2013.01)

(58) Field of Classification Search
CPC ........... G02B 7/08; G02B 7/04; H04N 5/2253; H04N 5/2254; G02N 7/04; H02N 2/00
USPC ................. 359/824, 823, 819, 811
See application file for complete search history.

(56) References Cited

U.S. PATENT DOCUMENTS

| | | | |
|---|---|---|---|
| 7,446,965 B2 * | 11/2008 | Su | G02B 7/08 359/823 |
| 7,643,232 B2 | 1/2010 | Su et al. | |
| 2007/0280667 A1 | 12/2007 | Shin | |
| 2008/0247059 A1 | 10/2008 | Dong | |

\* cited by examiner

*Primary Examiner* — Tuyen Tra
(74) *Attorney, Agent, or Firm* — Robert C. Kowert; Meyertons, Hood, Kivlin, Kowert & Goetzel, P.C.

(57) ABSTRACT

In some embodiments, a camera component includes an annular lens holder component having a threaded interior surface for translating rotational motion of an optics barrel component into motion along an optical axis of the optics barrel component. In some embodiments, the threaded interior surface of the lens holder component includes one or more threads complementary to one or more threads of a threaded exterior surface of an optics barrel component. In some embodiments, the optics barrel component is movably mounted on the threads of the threaded interior surface of the lens holder component for rotational motion within the lens holder component. In some embodiments, the optics barrel has a threaded exterior surface with one or more threads complementary to the threads of the threaded interior surface of the lens holder component. Some embodiments include a piezoelectric motor fixedly mounted to a base component.

18 Claims, 10 Drawing Sheets

PIEZOELECTRIC ACTUATOR FOR CAMERA MODULE

BACKGROUND

Technical Field

This disclosure relates generally to camera components.

Description of the Related Art

For high-end (and particularly for mobile) computing devices, it is common to incorporate miniature cameras and camera components. Such high-end mobile computing devices are referred to as multifunction devices.

Demands on improvements to performance of such miniature cameras and camera components are constant, as are demands for continued miniaturization, given the added features and devices added to such mobile devices.

In particular, demands to decrease the dimensions of camera components and demands for high image quality continue to create an ongoing desire for camera components that exhibit superior performance as measured in various ways, while consuming less space and energy.

SUMMARY OF EMBODIMENTS

In some embodiments, a camera component includes an annular lens holder component having a threaded interior surface for translating rotational motion of an optics barrel component into motion along an optical axis of the optics barrel component. In some embodiments, the threaded interior surface of the lens holder component includes one or more threads complementary to one or more threads of a threaded exterior surface of an optics barrel component. In some embodiments, the optics barrel component is movably mounted on the threads of the threaded interior surface of the lens holder component for rotational motion within the lens holder component. In some embodiments, the optics barrel has a threaded exterior surface with one or more threads complementary to the threads of the threaded interior surface of the lens holder component. Some embodiments include a piezoelectric motor fixedly mounted to a base component.

Figure 1A:
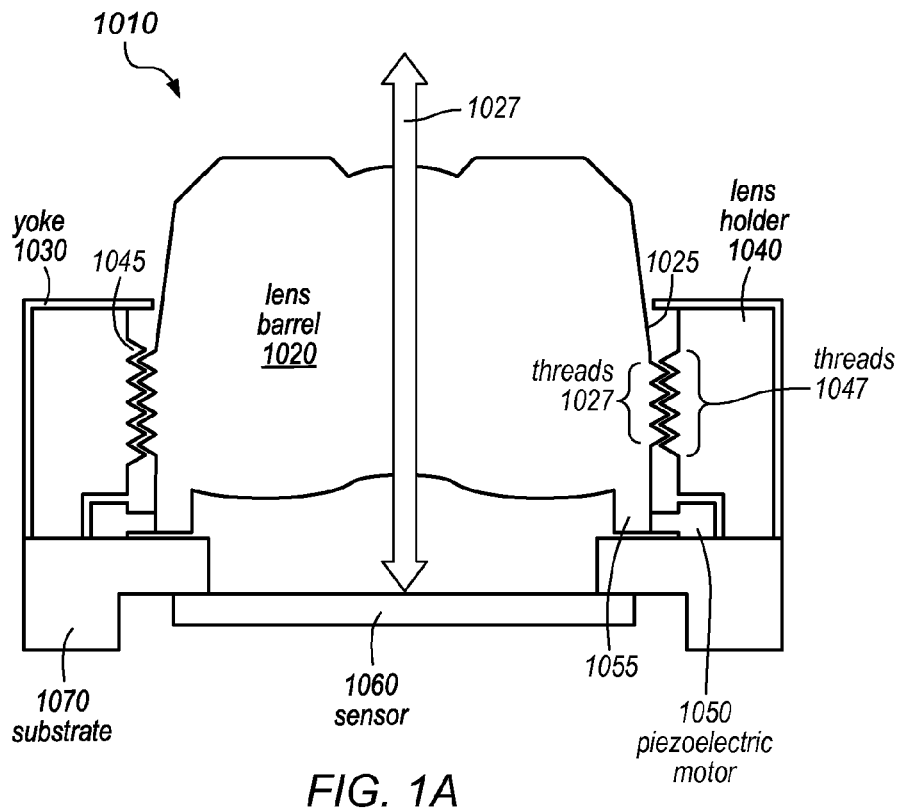
FIG. 1A depicts a camera component, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

In some embodiments, a multifunction device includes a camera or camera component. In some embodiments, the camera component includes one or more lenses for directing light to an image sensor component of the camera component. In some embodiments, the camera component includes an image sensor device. In some embodiments, the camera component includes a substrate. In some embodiments, the camera component includes an annular lens holder component having a threaded interior surface for translating rotational motion of an optics barrel component into motion along an optical axis of the optics barrel component.

In some embodiments, the threaded interior surface of the lens holder component includes one or more threads complementary to one or more threads of a threaded exterior surface of an optics barrel component. Some embodiments include the optics barrel component. In some embodiments, the optics barrel component is movably mounted on the threads of the threaded interior surface of the lens holder component for rotational motion within the lens holder component. In some embodiments, the optics barrel has a threaded exterior surface with one or more threads complementary to the threads of the threaded interior surface of the lens holder component.

Some embodiments include a piezoelectric motor fixedly mounted to a base component. In some embodiments, the piezo electric motor includes one or more rotational motion bridge piezoelectric actuators aligned for expansion and contraction along lines tangential to a circumference of the optics barrel component. Some embodiments further include one or more locking motion piezoelectric actuators aligned for expansion and contraction approximately radial to the circumference of the optics barrel component.

In some embodiments, the one or more locking motion piezoelectric actuators are mounted at ends of respective ones of the one or more rotational motion bridge piezoelectric actuators.

In some embodiments, when in an extended state, the one or more locking motion piezoelectric actuators produce a mechanical contact with an the optics barrel component to produce motion in response to expansion or contraction of the rotational motion bridge piezoelectric actuators, and when in a contracted state, the one or more locking motion piezoelectric actuators do not make mechanical contact with an the optics barrel component to produce motion in response to expansion or contraction of the rotational motion bridge piezoelectric actuators.

In some embodiments, the annular lens holder component is fixedly mounted to a base component. In some embodiments, the one or more rotational motion bridge piezoelectric actuators aligned for expansion and contraction along lines tangential to a circumference of the optics barrel component further include one or more pair of synchronized rotational motion bridge piezoelectric actuators aligned for expansion and contraction along lines tangential to a circumference of the optics barrel component and synchronized for complementary motion to adjust a focal distance of the camera component.

In some embodiments, the one or more rotational motion bridge piezoelectric actuators aligned for expansion and contraction along lines tangential to a circumference of the optics barrel component further include one or more pair of synchronized rotational motion bridge piezoelectric actuators aligned for expansion and contraction along lines tangential to a circumference of the optics barrel component and synchronized for complementary motion to adjust a distance between the optics barrel component and an image sensor component.

Some embodiments include a rotational motion actuator. In some embodiments, the rotational motion actuator includes an exterior component having a grooved interior surface. In some embodiments, the exterior component is fixedly mounted to a base component, and the grooved interior surface of the exterior component includes one or more grooves complementary to one or more tongues of an exterior surface of a barrel component.

Some embodiments include a barrel component. In some embodiments, the barrel component is movably mounted on the grooves of the grooved interior surface of the exterior component for rotation motion within the exterior component, and the barrel component has a tongued exterior surface with tongues complementary to the grooves of the interior surface of the exterior component.

Some embodiments include a linear-motion actuator motor fixedly mounted to the base component. In some embodiments, the linear-motion actuator motor includes one or more rotational motion linear-motion actuators aligned for expansion and contraction along lines tangential to a circumference of the barrel component.

Some embodiments include one or more locking motion linear-motion actuators mounted at ends of respective ones of the one or more rotational motion bridge linear-motion actuators.

In some embodiments, the one or more locking motion linear-motion actuators mounted at ends of respective ones of the one or more rotational motion bridge linear-motion actuators are each aligned transverse to an axis of expansion and contraction of a respective one of the rotational motion linear-motion actuators.

In some embodiments, when in an extended state, the one or more locking motion linear-motion actuators produce a mechanical contact with an the barrel component to produce motion in response to expansion or contraction of the rotational motion bridge linear-motion actuators.

In some embodiments, when in a contracted state, the one or more locking motion linear-motion actuators do not make mechanical contact with an the optics barrel component to produce motion in response to expansion or contraction of the rotational motion bridge linear-motion actuators.

In some embodiments, the linear-motion actuator motor further includes one or more piezoelectric actuators. In some embodiments, the linear-motion actuator motor further includes one or more electromagnetic actuators. In some embodiments, the linear-motion actuator motor further includes one or more thermoplastic linear actuators.

Some embodiments include a method of controlling the motion of a camera component. In some embodiments, the method includes producing a mechanical contact between one or more locking motion piezoelectric actuators and an optics barrel component by placing in an extended state the one or more locking motion piezoelectric actuators in preparation to produce motion in response to expansion or contraction of one or more rotational motion bridge piezoelectric actuators.

In some embodiments, the method includes expanding or contracting the one or more rotational motion bridge piezoelectric actuators. In some embodiments, the one or more rotational motion bridge piezoelectric actuators are aligned for expansion and contraction along lines tangential to a circumference of the optics barrel component.

In some embodiments, the method includes eliminating the mechanical contact between one or more locking motion piezoelectric actuators and the optics barrel component by placing the one or more locking motion piezoelectric actuators in a contracted state.

In some embodiments, in the contracted state, the one or more locking motion piezoelectric actuators do not make mechanical contact with an the optics barrel component to produce motion in response to expansion or contraction of the rotational motion bridge piezoelectric actuators.

In some embodiments, the method further includes translating rotational motion of the optics barrel component into motion along an optical axis of the optics barrel component by rotating the optics barrel component within a movable mount mounted on threads of a threaded interior surface of a lens holder component.

In some embodiments, the producing a mechanical contact between one or more locking motion piezoelectric actuators and an optics barrel component by placing in an extended state the one or more locking motion piezoelectric actuators further includes extending one or more locking motion linear-motion actuators mounted at ends of respective ones of the one or more rotational motion bridge linear-motion actuators that are each aligned transverse to an axis of expansion and contraction of a respective one of the rotational motion bridge piezoelectric actuators.

In some embodiments, the producing a mechanical contact between one or more locking motion piezoelectric actuators and an optics barrel component by placing in an extended state the one or more locking motion piezoelectric actuators further includes placing in an extended state the one or more complementary pair of locking motion piezoelectric actuators.

Some embodiments include a non-transitory computer-readable storage medium including program instructions. In some embodiments, the program instructions are executable by one or more processors to cause a camera component to implement producing a mechanical contact between one or more locking motion piezoelectric actuators and an optics barrel component by placing in an extended state the one or more locking motion piezoelectric actuators in preparation to produce motion in response to expansion or contraction of one or more rotational motion bridge piezoelectric actuators.

In some embodiments, the program instructions are executable by one or more processors to cause a camera component to implement expanding or contracting the one or more rotational motion bridge piezoelectric actuators.

In some embodiments, the one or more rotational motion bridge piezoelectric actuators are aligned for expansion and contraction along lines tangential to a circumference of the optics barrel component.

In some embodiments, the program instructions are executable by one or more processors to cause a camera component to implement eliminating the mechanical contact between one or more locking motion piezoelectric actuators and the optics barrel component by placing the one or more locking motion piezoelectric actuators in a contracted state.

In some embodiments, the program instructions executable by one or more processors to cause a camera component to implement the producing a mechanical contact between one or more locking motion piezoelectric actuators and an optics barrel component by placing in an extended state the one or more locking motion piezoelectric actuators further include program instructions executable by one or more processors to cause a camera component to implement extending one or more locking motion linear-motion actuators mounted at ends of respective ones of the one or more rotational motion bridge linear-motion actuators that are each aligned transverse to an axis of expansion and contraction of a respective one of the rotational motion bridge piezoelectric actuators.

In some embodiments, in the contracted state, the one or more locking motion piezoelectric actuators do not make mechanical contact with the optics barrel component to produce motion in response to expansion or contraction of the rotational motion bridge piezoelectric actuators.

Some embodiments further include program instructions executable by one or more processors to cause a camera component to implement translating rotational motion of the optics barrel component into motion along an optical axis of the optics barrel component by rotating the optics barrel component within a movable mount mounted on threads of a threaded interior surface of a lens holder component.

In some embodiments, the program instructions executable by one or more processors to cause a camera component to implement the producing a mechanical contact between one or more locking motion piezoelectric actuators and an optics barrel component by placing in an extended state the one or more locking motion piezoelectric actuators further include program instructions executable by one or more processors to cause a camera component to implement placing in an extended state the one or more complementary pair of locking motion piezoelectric actuators.

Introduction to Piezoelectric Materials

The piezoelectric effect is understood as the linear electromechanical interaction between the mechanical and the electrical state in crystalline materials with no inversion symmetry. The piezoelectric effect is a reversible process in that materials exhibiting the direct piezoelectric effect (the internal generation of electrical charge resulting from an applied mechanical force) also exhibit the reverse piezoelectric effect (the internal generation of a mechanical strain resulting from an applied electrical field). For example, lead zirconate titanate crystals will generate measurable piezoelectricity when their static structure is deformed by about 0.1% of the original dimension. Conversely, those same crystals will change about 0.1% of their static dimension when an external electric field is applied to the material.

A piezoelectric actuator converts an electrical signal into a precisely controlled physical displacement (stroke). If displacement is prevented, a useable force (blocking force) will develop. The precise movement control afforded by piezoelectric actuators is used to finely adjust machining tools, lenses, mirrors, or other equipment. Piezoelectric actuators are also used to control hydraulic valves, act as small-volume pumps or special-purpose motors, and in other applications requiring movement or force.

Example Embodiment Components

FIG. 1 depicts a camera component, according to some embodiments. Camera component 1010 includes a lens barrel 1020, a yoke/cover 1030, a lens holder 1040, a piezoelectric motor 1050, an image sensor 1060 and a substrate 1070. In some embodiments, a multifunction device includes a camera or camera component 1010. In some embodiments, the camera component 1010 includes one or more lenses (contained in lens barrel 1020 and not visible in FIG. 1) for directing light to an image sensor 1060 component of the camera component 1010. In some embodiments, the camera component 1010 includes an image sensor device 1060. In some embodiments, the camera component 1010 includes a substrate 1070. In the camera embodiments, the camera component 1010 includes an annular lens holder component 1040 having a threaded interior surface 1045 for translating rotational motion of a lens barrel or optics barrel component 1020 into motion along an optical axis 1027 of the optics barrel component 1020.

In some embodiments, the threaded interior surface 1045 of the lens holder component 1040 includes one or more threads 1047 complementary to one or more threads 1027 of a threaded exterior surface 1025 of an optics barrel component 1020. Some embodiments include the optics barrel component 1020. In some embodiments, the optics barrel component 1020 is movably mounted on the threads 1047 of the threaded interior surface 1045 of the lens holder component 1040 for rotational motion within the lens holder component 1040. In some embodiments, the optics barrel 1020 has a threaded exterior surface 1025 with one or more threads 1027 complementary to the threads 1047 of the threaded interior surface 1045 of the lens holder component 1040.

Some embodiments include a piezoelectric motor 1050 fixedly mounted to a base component (e.g., substrate 1070). In some embodiments, the piezoelectric motor 1050 includes one or more rotational motion bridge piezoelectric actuators (shown in FIG. 2 and discussed below) aligned for expansion and contraction along lines tangential to a circumference of the optics barrel component. Some embodiments further include one or more locking motion piezoelectric actuators (shown in FIGS. 2-8 and discussed below) aligned for expansion and contraction approximately radial to the circumference (shown in FIGS. 2-8 and discussed below) of the optics barrel component 1020.

In some embodiments, the one or more locking motion piezoelectric actuators are mounted at ends of respective ones of the one or more rotational motion bridge piezoelectric actuators.

In some embodiments, when in an extended state, the one or more locking motion piezoelectric actuators (shown in FIGS. 2-8 and discussed below) aligned for expansion and contraction approximately radial to the circumference (shown in FIGS. 2-8 and discussed below) of piezoelectric motor 1050 produce a mechanical contact 1055 with the optics barrel component 1020 to produce motion in response to expansion or contraction of the rotational motion bridge piezoelectric actuators (shown in FIGS. 2-8 and discussed below), and when in a contracted state, the one or more locking motion piezoelectric actuators (shown in FIGS. 2-8 and discussed below) do not make mechanical contact with an the optics barrel component 1020 to produce motion in response to expansion or contraction of the rotational motion bridge piezoelectric actuators (shown in FIGS. 2-8 and discussed below) of piezoelectric motor 1050.

In some embodiments, the annular lens holder component 1040 is fixedly mounted to a base component (also called substrate 1070). In some embodiments, the one or more rotational motion bridge piezoelectric actuators (shown in FIGS. 2-8 and discussed below) aligned for expansion and contraction along lines tangential to a circumference of the optics barrel component further include one or more pair of synchronized rotational motion bridge piezoelectric actuators (shown in FIGS. 2-8 and discussed below) aligned for expansion and contraction along lines tangential to a circumference (shown in FIGS. 2-8 and discussed below) of the optics barrel component (also called lens barrel) 1020 and synchronized for complementary motion to adjust a focal distance of the camera component 1010.

In some embodiments, the one or more rotational motion bridge piezoelectric actuators (shown in FIGS. 2-8 and discussed below) aligned for expansion and contraction along lines tangential to a circumference of the optics barrel component 1020 further include one or more pair of synchronized rotational motion bridge piezoelectric actuators (shown in FIGS. 2-8 and discussed below) aligned for expansion and contraction along lines tangential to a circumference of the optics barrel component 1020 and synchronized for complementary motion to adjust a distance between the optics barrel component 1020 and an image sensor component 1060.

Some embodiments include a method of controlling the motion of a camera component. In some embodiments, the method includes producing a mechanical contact between one or more locking motion piezoelectric actuators and an optics barrel component by placing in an extended state the one or more locking motion piezoelectric actuators in preparation to produce motion in response to expansion or contraction of one or more rotational motion bridge piezoelectric actuators.

In some embodiments, the method includes expanding or contracting the one or more rotational motion bridge piezoelectric actuators. In some embodiments, the one or more rotational motion bridge piezoelectric actuators are aligned for expansion and contraction along lines tangential to a circumference of the optics barrel component.

In some embodiments, the method includes eliminating the mechanical contact between one or more locking motion piezoelectric actuators and the optics barrel component by placing the one or more locking motion piezoelectric actuators in a contracted state.

In some embodiments, in the contracted state, the one or more locking motion piezoelectric actuators do not make mechanical contact with an the optics barrel component to produce motion in response to expansion or contraction of the rotational motion bridge piezoelectric actuators.

In some embodiments, the method further includes translating rotational motion of the optics barrel component into motion along an optical axis of the optics barrel component by rotating the optics barrel component within a movable mount mounted on threads of a threaded interior surface of a lens holder component.

Figure 1B:
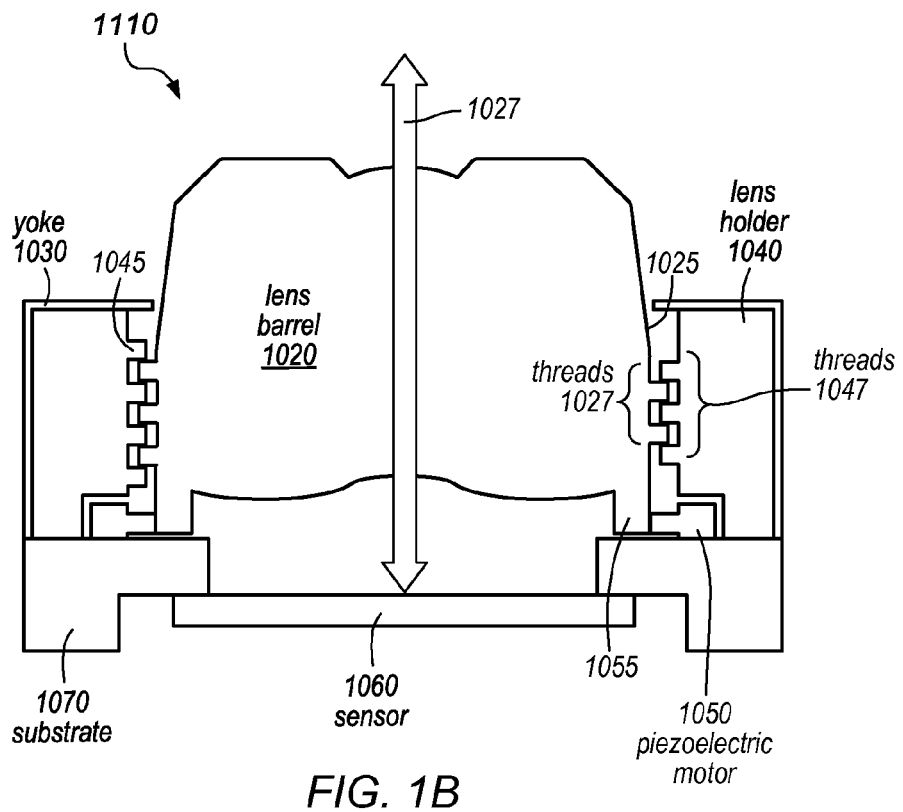
FIG. 1B depicts a rotational motion component, according to some embodiments.

FIG. 1B depicts a rotational motion component, according to some embodiments. Some embodiments include a rotational motion actuator. In some embodiments, the rotational motion actuator 1111 includes an exterior component 1140 having a grooved interior surface 1145. In some embodiments, the exterior component 1140 is fixedly mounted to a base component or substrate 1170, and the grooved interior surface 1145 of the exterior component 1140 includes one or more grooves 1147 complementary to one or more tongues 1127 of an exterior surface of a barrel component 1120.

Some embodiments include a barrel component 1120. In some embodiments, the barrel component 1120 is movably mounted on the grooves 1147 of the grooved interior surface 1145 of the exterior component 1140 for rotational motion within the exterior component 1140, and the barrel component 1120 has a tongued exterior surface 1125 with tongues 1127 complementary to the grooves 1147 of the interior surface 1145 of the exterior component 1140.

Some embodiments include a linear-motion actuator motor 1150 fixedly mounted to the base component 1170. In some embodiments, the linear-motion actuator motor 1150 includes one or more rotational motion linear-motion actuators aligned for expansion and contraction along lines tangential to a circumference of the barrel component (shown in FIGS. 2-8 and discussed below).

Some embodiments include one or more locking motion linear-motion actuators mounted at ends of respective ones of the one or more rotational motion bridge linear-motion actuators (shown in FIGS. 2-8 and discussed below).

In some embodiments, the one or more locking motion linear-motion actuators mounted at ends of respective ones of the one or more rotational motion bridge linear-motion actuators are each aligned transverse to an axis of expansion and contraction of a respective one of the rotational motion linear-motion actuators (shown in FIGS. 2-8).

In some embodiments, when in an extended state, the one or more locking motion linear-motion actuators produce a mechanical contact with an the barrel component 1120 to produce motion in response to expansion or contraction of the rotational motion bridge linear-motion actuators.

In some embodiments, when in a contracted state, the one or more locking motion linear-motion actuators do not make mechanical contact with an the optics barrel component to produce motion in response to expansion or contraction of the rotational motion bridge linear-motion actuators.

In some embodiments, the linear-motion actuator motor further includes one or more piezoelectric actuators. In some embodiments, the linear-motion actuator motor further includes one or more electromagnetic actuators. In some embodiments, the linear-motion actuator motor further includes one or more thermoplastic linear actuators.

Figure 2:
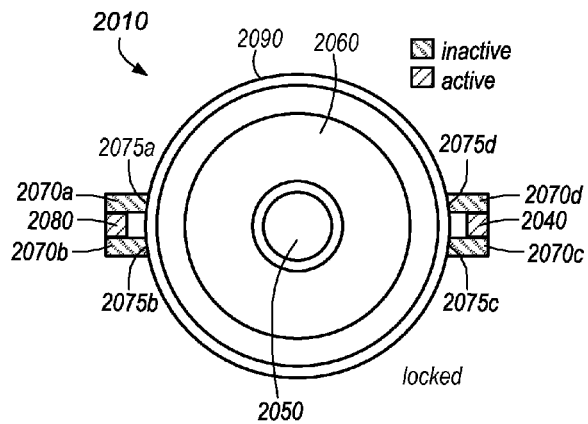
FIG. 2 illustrates a first state of a camera component during executing of a method for moving a lens barrel using a piezoelectric motor, according to some embodiments.

FIG. 2 illustrates a first state of a camera component during executing of a method for moving a lens barrel using a piezoelectric motor, according to some embodiments. A camera component 2010 includes an optics barrel component 2060 carrying optics or a lens 2050 and having a circumference 2090. Components of a piezoelectric motor include locking motion piezoelectric actuators 2070a-2070d aligned for expansion and contraction approximately radial to the circumference 2090 of the optics barrel component 2060 and rotational motion bridge piezoelectric actuators 2040 and 2080.

In some embodiments, the one or more locking motion piezoelectric actuators 2070a-2070d are mounted at ends of respective ones of the one or more rotational motion bridge piezoelectric actuators 2040 and 2080. A first group of locking motion piezoelectric actuators includes locking motion piezoelectric actuator 2070a attached to rotational motion bridge piezoelectric actuator 2080 and locking motion piezoelectric actuator 2070c attached to rotational motion bridge piezoelectric actuator 2040. A second group of locking motion piezoelectric actuators includes locking motion piezoelectric actuator 2070b attached to rotational motion bridge piezoelectric actuator 2080 and locking motion piezoelectric actuator 2070d attached to rotational motion bridge piezoelectric actuator 2040.

In the state depicted in FIG. 2, the first group of locking motion piezoelectric actuators including locking motion piezoelectric actuator 2070a attached to rotational motion bridge piezoelectric actuator 2080 and locking motion piezoelectric actuator 2070c attached to rotational motion bridge piezoelectric actuator 2040 is locked in an extended state to produce a mechanical contact 2075a and 2075c with the circumference 2090 of the optics barrel component 2060.

In the state depicted in FIG. 2, the second group of locking motion piezoelectric actuators includes locking motion piezoelectric actuator 2070b attached to rotational motion bridge piezoelectric actuator 2080 and locking motion piezoelectric actuator 2070d attached to rotational motion bridge piezoelectric actuator 2040 is locked in an extended state to produce a mechanical contact 2075b and 2075d with the circumference 2090 of the optics barrel component 2060. In the state depicted in FIG. 2, rotational motion bridge piezoelectric actuator 2040 is in the contracted (inactive) state and rotational motion bridge piezoelectric actuator 2080 is in the contracted (inactive) state.

Figure 3:
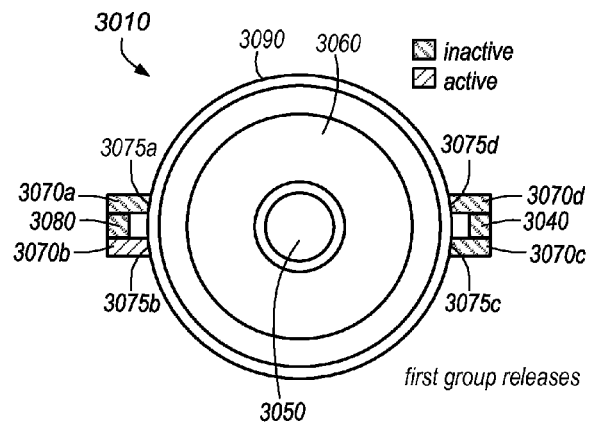
FIG. 3 depicts a second state of a camera component during executing of a method for moving a lens barrel using a piezoelectric motor, according to some embodiments.

FIG. 3 depicts a second state of a camera component during executing of a method for moving a lens barrel using a piezoelectric motor, according to some embodiments. A camera component 3010 includes an optics barrel component 3060 carrying optics or a lens 3050 and having a circumference 3090. Components of a piezoelectric motor include locking motion piezoelectric actuators 3070a-3070d aligned for expansion and contraction approximately radial to the circumference 3090 of the optics barrel component 3060 and rotational motion bridge piezoelectric actuators 3040 and 3080.

In some embodiments, the one or more locking motion piezoelectric actuators 3070a-3070d are mounted at ends of respective ones of the one or more rotational motion bridge piezoelectric actuators 3040 and 3080. A first group of locking motion piezoelectric actuators includes locking motion piezoelectric actuator 3070a attached to rotational motion bridge piezoelectric actuator 3080 and locking motion piezoelectric actuator 3070c attached to rotational motion bridge piezoelectric actuator 3040. A second group of locking motion piezoelectric actuators includes locking motion piezoelectric actuator 3070b attached to rotational motion bridge piezoelectric actuator 3080 and locking motion piezoelectric actuator 3070d attached to rotational motion bridge piezoelectric actuator 3040.

In the state depicted in FIG. 3, the first group of locking motion piezoelectric actuators including locking motion piezoelectric actuator 3070a attached to rotational motion bridge piezoelectric actuator 3080 and locking motion piezoelectric actuator 3070c attached to rotational motion bridge piezoelectric actuator 3040 is locked in an inactive state to prevent mechanical contact with the circumference 3090 of the optics barrel component 3060.

In the state depicted in FIG. 3, the second group of locking motion piezoelectric actuators including locking motion piezoelectric actuator 3070b attached to rotational motion bridge piezoelectric actuator 3080 and locking motion piezoelectric actuator 3070d attached to rotational motion bridge piezoelectric actuator 3040 is locked in an extended state to produce a mechanical contact 3075b and 3075d with the circumference 3090 of the optics barrel component 3060. In the state depicted in FIG. 3, rotational motion bridge piezoelectric actuator 3040 is in the contracted (inactive) state and rotational motion bridge piezoelectric actuator 3080 is in the contracted (inactive) state.

Figure 4:
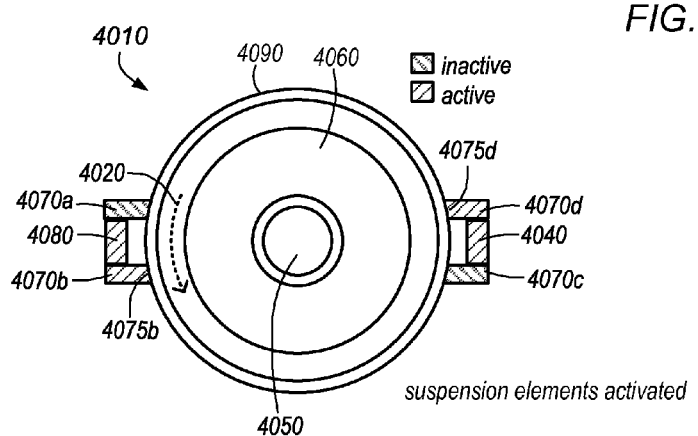
FIG. 4 illustrates a third state of a camera component during executing of a method for moving a lens barrel using a piezoelectric motor, according to some embodiments.

FIG. 4 illustrates a third state of a camera component during executing of a method for moving a lens barrel using a piezoelectric motor, according to some embodiments. A camera component 4010 includes an optics barrel component 4060 carrying optics or a lens 4050 and having a circumference 4090. Components of a piezoelectric motor include locking motion piezoelectric actuators 4070a-4070d aligned for expansion and contraction approximately radial to the circumference 4090 of the optics barrel component 4060 and rotational motion bridge piezoelectric actuators 4040 and 4080.

In some embodiments, the one or more locking motion piezoelectric actuators 4070a-4070d are mounted at ends of respective ones of the one or more rotational motion bridge piezoelectric actuators 4040 and 4080. A first group of locking motion piezoelectric actuators includes locking motion piezoelectric actuator 4070a attached to rotational motion bridge piezoelectric actuator 4080 and locking motion piezoelectric actuator 4070c attached to rotational motion bridge piezoelectric actuator 4040. A second group of locking motion piezoelectric actuators includes locking motion piezoelectric actuator 4070b attached to rotational motion bridge piezoelectric actuator 4080 and locking motion piezoelectric actuator 4070d attached to rotational motion bridge piezoelectric actuator 4040.

In the state depicted in FIG. 4, the first group of locking motion piezoelectric actuators including locking motion piezoelectric actuator 4070a attached to rotational motion bridge piezoelectric actuator 4080 and locking motion piezoelectric actuator 4070c attached to rotational motion bridge piezoelectric actuator 4040 is locked in a contracted state to prevent a mechanical contact with the circumference 4090 of the optics barrel component 4060.

In the state depicted in FIG. 4, the second group of locking motion piezoelectric actuators includes locking motion piezoelectric actuator 4070b attached to rotational motion bridge piezoelectric actuator 4080 and locking motion piezoelectric actuator 4070d attached to rotational motion bridge piezoelectric actuator 4040 is locked in an extended state to produce a mechanical contact 4075b and 4075d with the circumference 4090 of the optics barrel component 4060. In the state depicted in FIG. 4, rotational motion bridge piezoelectric actuator 4040 is in the extended (active) state and rotational motion bridge piezoelectric actuator 4080 is in the extended (active) state to produce a rotation 4020 of optics barrel 4060.

Figure 5:
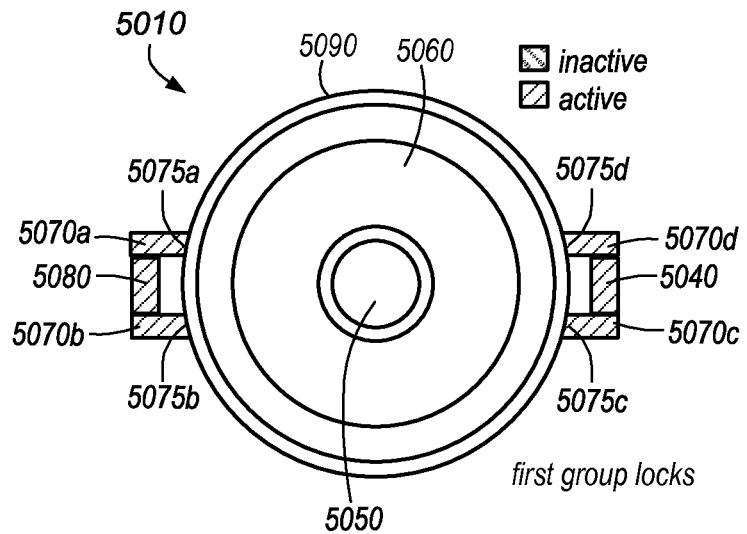
FIG. 5 depicts a fourth state of a camera component during executing of a method for moving a lens barrel using a piezoelectric motor, according to some embodiments.

FIG. 5 depicts a fourth state of a camera component during executing of a method for moving a lens barrel using a piezoelectric motor, according to some embodiments. A camera component 5010 includes an optics barrel component 5060 carrying optics or a lens 5050 and having a circumference 5090. Components of a piezoelectric motor include locking motion piezoelectric actuators 5070a-5070d aligned for expansion and contraction approximately radial to the circumference 5090 of the optics barrel component 5060 and rotational motion bridge piezoelectric actuators 5040 and 5080.

In some embodiments, the one or more locking motion piezoelectric actuators 5070a-5070d are mounted at ends of respective ones of the one or more rotational motion bridge piezoelectric actuators 5040 and 5080. A first group of locking motion piezoelectric actuators includes locking motion piezoelectric actuator 5070a attached to rotational motion bridge piezoelectric actuator 5080 and locking motion piezoelectric actuator 5070c attached to rotational motion bridge piezoelectric actuator 5040. A second group of locking motion piezoelectric actuators includes locking motion piezoelectric actuator 5070b attached to rotational motion bridge piezoelectric actuator 5080 and locking motion piezoelectric actuator 5070d attached to rotational motion bridge piezoelectric actuator 5040.

In the state depicted in FIG. 5, the first group of locking motion piezoelectric actuators including locking motion piezoelectric actuator 5070a attached to rotational motion bridge piezoelectric actuator 5080 and locking motion piezoelectric actuator 5070c attached to rotational motion bridge piezoelectric actuator 5040 is locked in an extended state to produce a mechanical contact 5075a and 5075c with the circumference 5090 of the optics barrel component 5060.

In the state depicted in FIG. 5, the second group of locking motion piezoelectric actuators includes locking motion piezoelectric actuator 5070b attached to rotational motion bridge piezoelectric actuator 5080 and locking motion piezoelectric actuator 5070d attached to rotational motion bridge piezoelectric actuator 5040 is locked in an extended state to produce a mechanical contact 5075b and 5075d with the circumference 5090 of the optics barrel component 5060. In the state depicted in FIG. 5, rotational motion bridge piezoelectric actuator 5040 is in the extended (active) state and rotational motion bridge piezoelectric actuator 5080 is in the extended (active) state.

Figure 6:
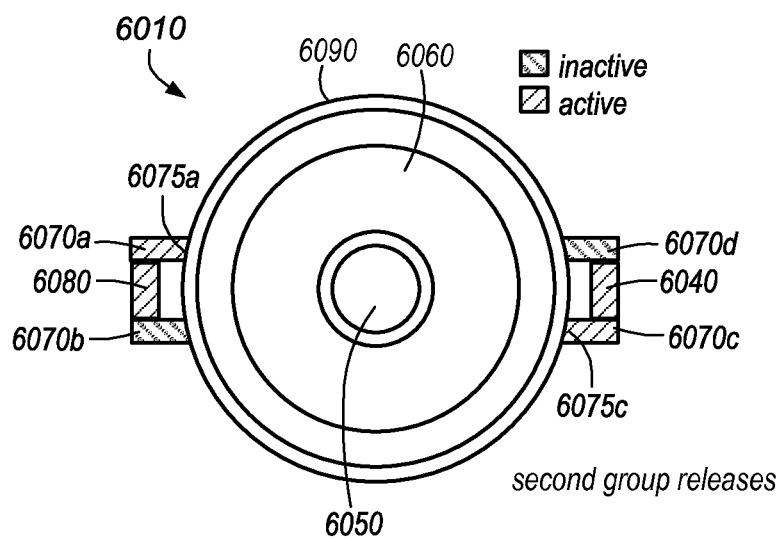
FIG. 6 illustrates a fifth state of a camera component during executing of a method for moving a lens barrel using a piezoelectric motor, according to some embodiments.

FIG. 6 illustrates a fifth state of a camera component during executing of a method for moving a lens barrel using a piezoelectric motor, according to some embodiments. A camera component 6010 includes an optics barrel component 6060 carrying optics or a lens 6050 and having a circumference 6090. Components of a piezoelectric motor include locking motion piezoelectric actuators 6070a-6070d aligned for expansion and contraction approximately radial to the circumference 6090 of the optics barrel component 6060 and rotational motion bridge piezoelectric actuators 6040 and 6080.

In some embodiments, the one or more locking motion piezoelectric actuators 6070a-6070d are mounted at ends of respective ones of the one or more rotational motion bridge piezoelectric actuators 6040 and 6080. A first group of locking motion piezoelectric actuators includes locking motion piezoelectric actuator 6070a attached to rotational motion bridge piezoelectric actuator 6080 and locking motion piezoelectric actuator 6070c attached to rotational motion bridge piezoelectric actuator 6040. A second group of locking motion piezoelectric actuators includes locking motion piezoelectric actuator 6070b attached to rotational motion bridge piezoelectric actuator 6080 and locking motion piezoelectric actuator 6070d attached to rotational motion bridge piezoelectric actuator 6040.

In the state depicted in FIG. 6, the first group of locking motion piezoelectric actuators including locking motion piezoelectric actuator 6070a attached to rotational motion bridge piezoelectric actuator 6080 and locking motion piezoelectric actuator 6070c attached to rotational motion bridge piezoelectric actuator 6040 is locked in an extended state to produce a mechanical contact 6075a and 6075c with the circumference 6090 of the optics barrel component 6060.

In the state depicted in FIG. 6, the second group of locking motion piezoelectric actuators includes locking motion piezoelectric actuator 6070b attached to rotational motion bridge piezoelectric actuator 6080 and locking motion piezoelectric actuator 6070d attached to rotational motion bridge piezoelectric actuator 6040 is locked in a contracted state to prevent a mechanical contact with the circumference 6090 of the optics barrel component 6060. In the state depicted in FIG. 6, rotational motion bridge piezoelectric actuator 6040 is in the extended (active) state and rotational motion bridge piezoelectric actuator 6080 is in the extended (active) state.

Figure 7:
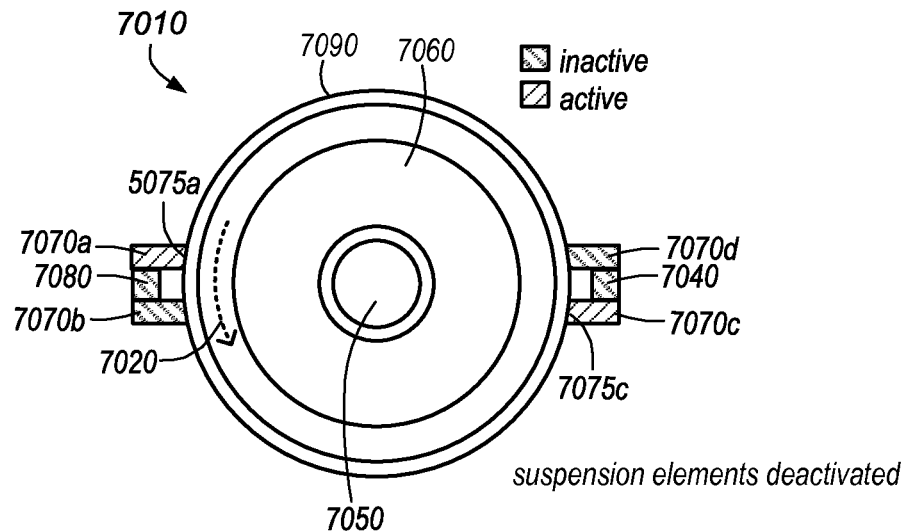
FIG. 7 depicts a sixth state of a camera component during executing of a method for moving a lens barrel using a piezoelectric motor, according to some embodiments.

FIG. 7 depicts a sixth state of a camera component during executing of a method for moving a lens barrel using a piezoelectric motor, according to some embodiments. A camera component 7010 includes an optics barrel component 7060 carrying optics or a lens 7050 and having a circumference 7090. Components of a piezoelectric motor include locking motion piezoelectric actuators 7070a-7070d aligned for expansion and contraction approximately radial to the circumference 7090 of the optics barrel component 7060 and rotational motion bridge piezoelectric actuators 7040 and 7080.

In some embodiments, the one or more locking motion piezoelectric actuators 7070a-7070d are mounted at ends of respective ones of the one or more rotational motion bridge piezoelectric actuators 7040 and 7080. A first group of locking motion piezoelectric actuators includes locking motion piezoelectric actuator 7070a attached to rotational motion bridge piezoelectric actuator 7080 and locking motion piezoelectric actuator 7070c attached to rotational motion bridge piezoelectric actuator 7040. A second group of locking motion piezoelectric actuators includes locking motion piezoelectric actuator 7070b attached to rotational motion bridge piezoelectric actuator 7080 and locking motion piezoelectric actuator 7070d attached to rotational motion bridge piezoelectric actuator 7040.

In the state depicted in FIG. 7, the first group of locking motion piezoelectric actuators including locking motion piezoelectric actuator 7070a attached to rotational motion bridge piezoelectric actuator 7080 and locking motion piezoelectric actuator 7070c attached to rotational motion bridge piezoelectric actuator 7040 is locked in an extended state to produce a mechanical contact 7075a and 7075c with the circumference 7090 of the optics barrel component 7060.

In the state depicted in FIG. 7, the second group of locking motion piezoelectric actuators includes locking motion piezoelectric actuator 7070b attached to rotational motion bridge piezoelectric actuator 7080 and locking motion piezoelectric actuator 7070d attached to rotational motion bridge piezoelectric actuator 7040 is locked in a contracted state to prevent a mechanical contact with the circumference 7090 of the optics barrel component 7060. In the state depicted in FIG. 7, rotational motion bridge piezoelectric actuator 7040 is in the contracted (inactive) state and rotational motion bridge piezoelectric actuator 7080 is in the contracted (inactive) state to produce rotational motion 7020 by optics barrel 7060.

Figure 8:
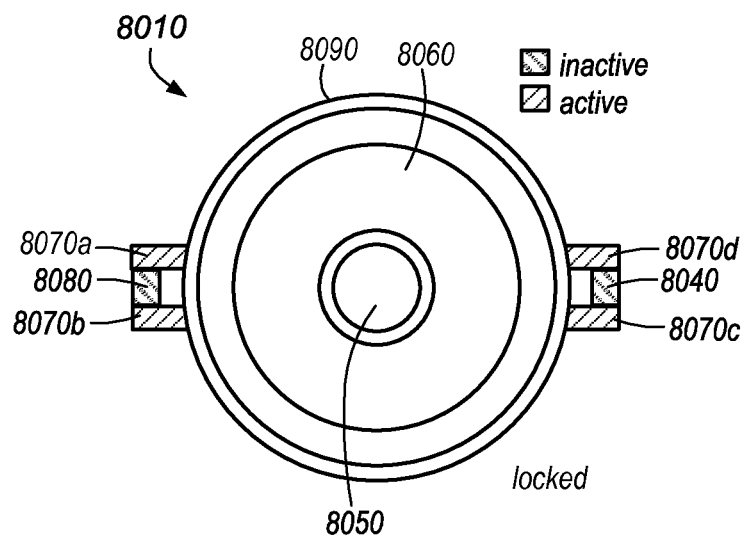
FIG. 8 illustrates an eighth state of a camera component during executing of a method for moving a lens barrel using a piezoelectric motor according to some embodiments.

FIG. 8 illustrates an eighth state of a camera component during executing of a method for moving a lens barrel using a piezoelectric motor according to some embodiments. A camera component 8010 includes an optics barrel component 8060 carrying optics or a lens 8050 and having a circumference 8090. Components of a piezoelectric motor include locking motion piezoelectric actuators 8070a-8070d aligned for expansion and contraction approximately radial to the circumference 8090 of the optics barrel component 8060 and rotational motion bridge piezoelectric actuators 8040 and 8080.

In some embodiments, the one or more locking motion piezoelectric actuators 8070a-8070d are mounted at ends of respective ones of the one or more rotational motion bridge piezoelectric actuators 8040 and 8080. A first group of locking motion piezoelectric actuators includes locking motion piezoelectric actuator 8070a attached to rotational motion bridge piezoelectric actuator 8080 and locking motion piezoelectric actuator 8070c attached to rotational motion bridge piezoelectric actuator 8040. A second group of locking motion piezoelectric actuators includes locking motion piezoelectric actuator 8070b attached to rotational motion bridge piezoelectric actuator 8080 and locking motion piezoelectric actuator 8070d attached to rotational motion bridge piezoelectric actuator 8040.

In the state depicted in FIG. 8, the first group of locking motion piezoelectric actuators including locking motion piezoelectric actuator 8070a attached to rotational motion bridge piezoelectric actuator 8080 and locking motion piezoelectric actuator 8070c attached to rotational motion bridge piezoelectric actuator 8040 is locked in an extended state to produce a mechanical contact 8075a and 8075c with the circumference 8090 of the optics barrel component 8060.

In the state depicted in FIG. 8, the second group of locking motion piezoelectric actuators includes locking motion piezoelectric actuator 8070b attached to rotational motion bridge piezoelectric actuator 8080 and locking motion piezoelectric actuator 8070d attached to rotational motion bridge piezoelectric actuator 8040 is locked in an extended state to produce a mechanical contact 8075b and 8075d with the circumference 8090 of the optics barrel component 8060. In the state depicted in FIG. 8, rotational motion bridge piezoelectric actuator 8040 is in the contracted (inactive) state and rotational motion bridge piezoelectric actuator 8080 is in the contracted (inactive) state.

Figure 9:
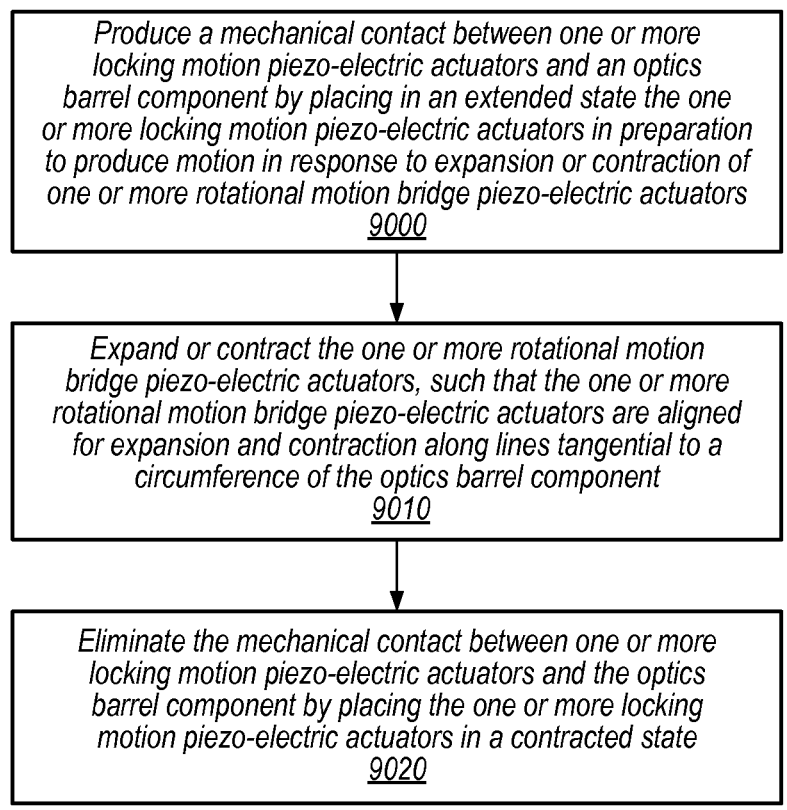
FIG. 9 is a high-level logical flowchart of a process for moving a lens barrel using a piezoelectric motor, according to some embodiments.

FIG. 9 is a high-level logical flowchart of a process for moving a lens barrel using a piezoelectric motor, according to some embodiments. A mechanical contact is produced between one or more locking motion piezoelectric actuators and an optics barrel component by placing in an extended state the one or more locking motion piezoelectric actuators in preparation to produce motion in response to expansion or contraction of one or more rotational motion bridge piezoelectric actuators (block 9000). The one or more rotational motion bridge piezoelectric actuators are expanded or contracted, such that the one or more rotational motion bridge piezoelectric actuators are aligned for expansion and contraction along lines tangential to a circumference of the optics barrel component (block 9010). The mechanical contact between one or more locking motion piezoelectric actuators and the optics barrel component is eliminated by placing the one or more locking motion piezoelectric actuators in a contracted state (block 9020).

Figure 10:
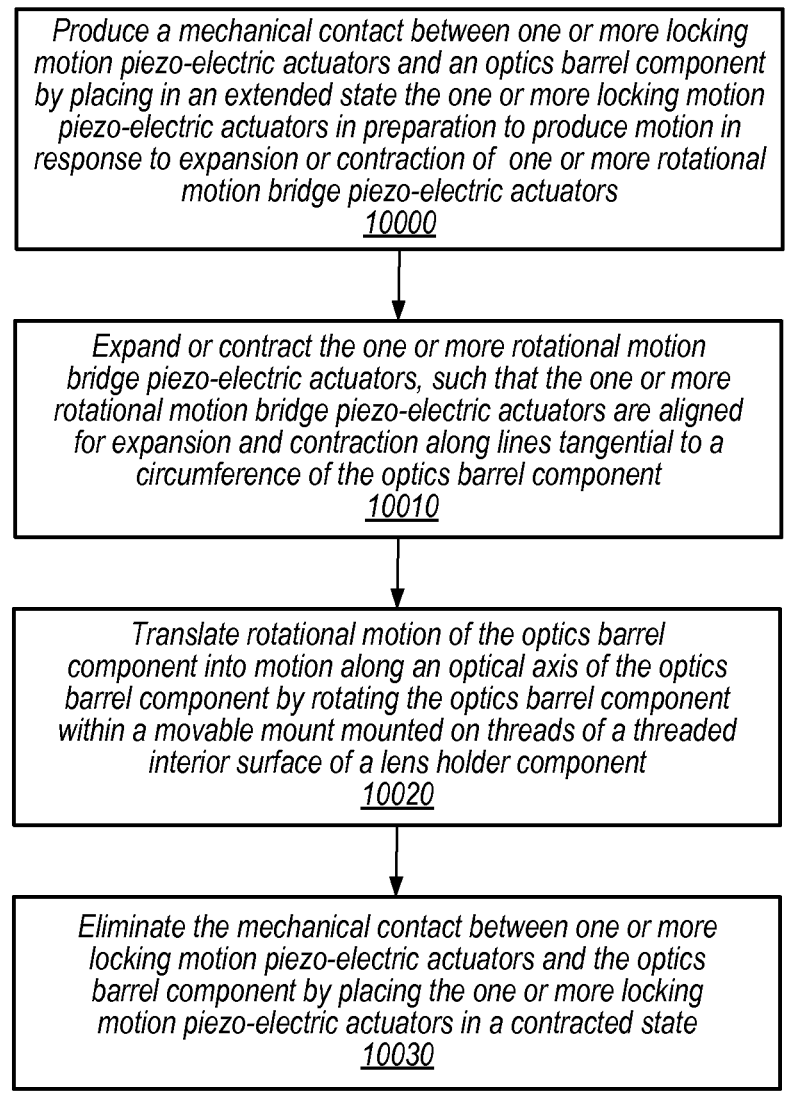
FIG. 10 is a high-level logical flowchart of a process for moving a lens barrel using a piezoelectric motor, according to some embodiments.

FIG. 10 is a high-level logical flowchart of a process for moving a lens barrel using a piezoelectric motor, according to some embodiments. A mechanical contact is produced between one or more locking motion piezoelectric actuators and an optics barrel component by placing in an extended state the one or more locking motion piezoelectric actuators in preparation to produce motion in response to expansion or contraction of one or more rotational motion bridge piezoelectric actuators (block 10000).

The one or more rotational motion bridge piezoelectric actuators is expanded or contracted, such that the one or more rotational motion bridge piezoelectric actuators are aligned for expansion and contraction along lines tangential to a circumference of the optics barrel component (block 10010). Rotational motion of the optics barrel component is translated into motion along an optical axis of the optics barrel component by rotating the optics barrel component within a movable mount mounted on threads of a threaded interior surface of a lens holder component (block 10020). The mechanical contact between the one or more locking motion piezoelectric actuators and the optics barrel component is eliminated by placing the one or more locking motion piezoelectric actuators in a contracted state (block 10030).

Figure 11:
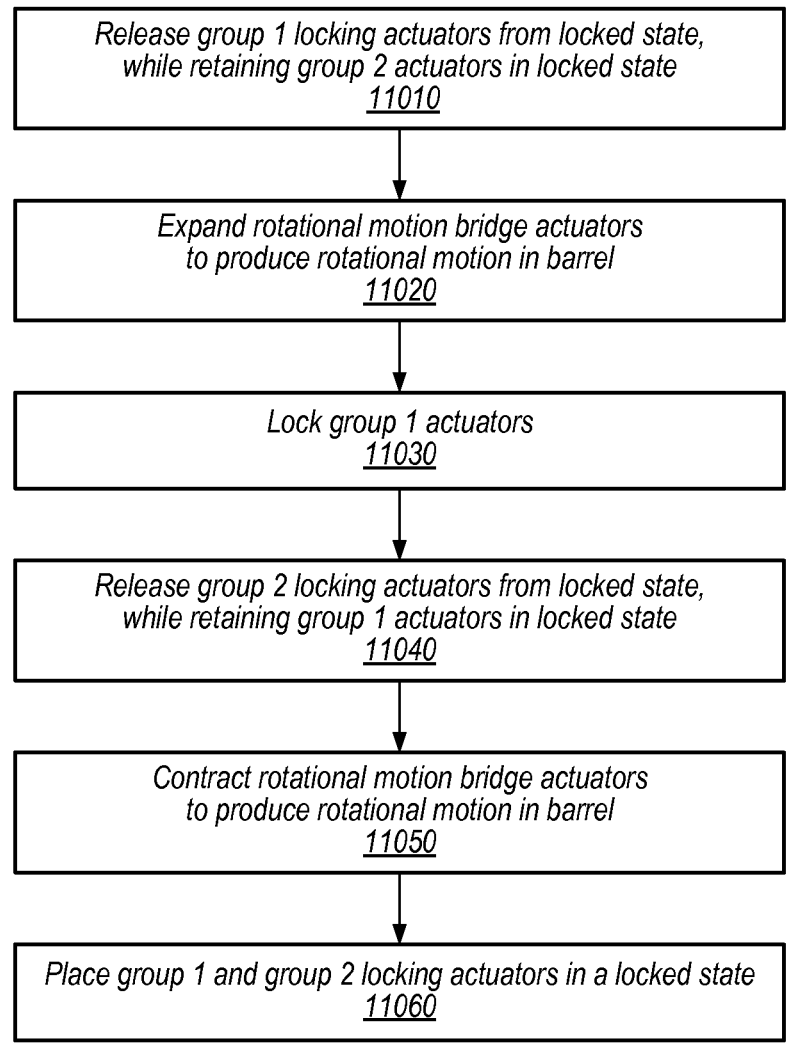
FIG. 11 is a high-level logical flowchart of a process for moving a lens barrel using a piezoelectric motor, according to some embodiments.

FIG. 11 is a high-level logical flowchart of a process for moving a lens barrel using a piezoelectric motor, according to some embodiments. Group 1 locking actuators are released from locked state, while retaining group 2 actuators in locked state (block 11010). Referring briefly to FIGS. 2 and 3, the process described at block 10010 starts in the state depicted in FIG. 2. In the state depicted in FIG. 2, the first group of locking motion piezoelectric actuators including locking motion piezoelectric actuator 2070*a* attached to rotational motion bridge piezoelectric actuator 2080 and locking motion piezoelectric actuator 2070*c* attached to rotational motion bridge piezoelectric actuator 2040 is locked in an extended state to produce a mechanical contact 2075*a* and 2075*c* with the circumference 2090 of the optics barrel component 2060.

In the state depicted in FIG. 2, the second group of locking motion piezoelectric actuators includes locking motion piezoelectric actuator 2070*b* attached to rotational motion bridge piezoelectric actuator 2080 and locking motion piezoelectric actuator 2070*d* attached to rotational motion bridge piezoelectric actuator 2040 is locked in an extended state to produce a mechanical contact 2075*b* and 2075*d* with the circumference 2090 of the optics barrel component 2060. In the state depicted in FIG. 2, rotational motion bridge piezoelectric actuator 2040 is in the contracted (inactive) state and rotational motion bridge piezoelectric actuator 2080 is in the contracted (inactive) state.

The process described in Block 10010 represents a transition to the state depicted in FIG. 3. In the state depicted in FIG. 3, the first group of locking motion piezoelectric actuators including locking motion piezoelectric actuator 3070*a* attached to rotational motion bridge piezoelectric actuator 3080 and locking motion piezoelectric actuator 3070*c* attached to rotational motion bridge piezoelectric actuator 3040 is locked in an inactive state to prevent mechanical contact with the circumference 3090 of the optics barrel component 3060.

In the state depicted in FIG. 3, the second group of locking motion piezoelectric actuators including locking motion piezoelectric actuator 3070*b* attached to rotational motion bridge piezoelectric actuator 3080 and locking motion piezoelectric actuator 3070*d* attached to rotational motion bridge piezoelectric actuator 3040 is locked in an extended state to produce a mechanical contact 3075*b* and 3075*d* with the circumference 3090 of the optics barrel component 3060. In the state depicted in FIG. 3, rotational motion bridge piezoelectric actuator 3040 is in the contracted (inactive) state and rotational motion bridge piezoelectric actuator 3080 is in the contracted (inactive) state.

Returning to FIG. 11, rotational motion bridge actuators are expanded to produce rotational motion in barrel (block 11020). Block 11020 represents the transition from FIG. 3, which is described above, to FIG. 4. Referring briefly to FIG. 4, in the state depicted in FIG. 4, the first group of locking motion piezoelectric actuators including locking motion piezoelectric actuator 4070*a* attached to rotational motion bridge piezoelectric actuator 4080 and locking motion piezoelectric actuator 4070*c* attached to rotational motion bridge piezoelectric actuator 4040 is locked in a contracted state to prevent a mechanical contact with the circumference 4090 of the optics barrel component 4060.

In the state depicted in FIG. 4, the second group of locking motion piezoelectric actuators includes locking motion piezoelectric actuator 4070*b* attached to rotational motion bridge piezoelectric actuator 4080 and locking motion piezoelectric actuator 4070*d* attached to rotational motion bridge piezoelectric actuator 4040 is locked in an extended state to produce a mechanical contact 4075*b* and 4075*d* with the circumference 4090 of the optics barrel component 4060. In the state depicted in FIG. 4, rotational motion bridge piezoelectric actuator 4040 is in the extended (active) state and rotational motion bridge piezoelectric actuator 4080 is in the extended (active) state to produce a rotation 4020 of optics barrel 4060.

Returning to FIG. 11, group 1 actuators are locked (block 11030). Block 11030 represents the transition from FIG. 4, which is described above, to FIG. 5. Referring briefly to FIG. 5, the first group of locking motion piezoelectric actuators including locking motion piezoelectric actuator 5070*a* attached to rotational motion bridge piezoelectric actuator 5080 and locking motion piezoelectric actuator 5070*c* attached to rotational motion bridge piezoelectric actuator 5040 is locked in an extended state to produce a mechanical contact 5075*a* and 5075*c* with the circumference 5090 of the optics barrel component 5060.

In the state depicted in FIG. 5, the second group of locking motion piezoelectric actuators includes locking motion piezoelectric actuator 5070*b* attached to rotational motion bridge piezoelectric actuator 5080 and locking motion piezoelectric actuator 5070*d* attached to rotational motion bridge piezoelectric actuator 5040 is locked in an extended state to produce a mechanical contact 5075*b* and 5075*d* with the circumference 5090 of the optics barrel component 5060. In the state depicted in FIG. 5, rotational motion bridge piezoelectric actuator 5040 is in the extended (active) state and rotational motion bridge piezoelectric actuator 5080 is in the extended (active) state.

Returning to FIG. 11, group 2 locking actuators are released from locked state, while retaining group 1 actuators in locked state (block 11040). Block 11040 represents the transition from FIG. 5, which is described above, to FIG. 6. Referring briefly to FIG. 6, the first group of locking motion piezoelectric actuators including locking motion piezoelectric actuator 6070*a* attached to rotational motion bridge piezoelectric actuator 6080 and locking motion piezoelectric actuator 6070*c* attached to rotational motion bridge piezoelectric actuator 6040 is locked in an extended state to produce a mechanical contact 6075*a* and 6075*c* with the circumference 6090 of the optics barrel component 6060.

In the state depicted in FIG. 6, the second group of locking motion piezoelectric actuators includes locking motion piezoelectric actuator 6070*b* attached to rotational motion bridge piezoelectric actuator 6080 and locking motion piezoelectric actuator 6070*d* attached to rotational motion bridge piezoelectric actuator 6040 is locked in a contracted state to prevent a mechanical contact with the circumference 6090 of the optics barrel component 6060. In the state depicted in FIG. 6, rotational motion bridge piezoelectric actuator 6040 is in the extended (active) state and rotational motion bridge piezoelectric actuator 6080 is in the extended (active) state.

Returning to FIG. 11, rotational motion bridge actuators are contracted to produce rotational motion in barrel (block 11050). Block 11050 represents the transition from FIG. 6, which is described above, to FIG. 7. Referring briefly to FIG. 7, the first group of locking motion piezoelectric actuators including locking motion piezoelectric actuator 7070*a* attached to rotational motion bridge piezoelectric actuator 7080 and locking motion piezoelectric actuator 7070*c* attached to rotational motion bridge piezoelectric actuator 7040 is locked in an extended state to produce a mechanical contact 7075*a* and 7075*c* with the circumference 7090 of the optics barrel component 7060.

In the state depicted in FIG. 7, the second group of locking motion piezoelectric actuators includes locking motion piezoelectric actuator 7070*b* attached to rotational motion bridge piezoelectric actuator 7080 and locking motion piezoelectric actuator 7070d attached to rotational motion bridge piezoelectric actuator 7040 is locked in a contracted state to prevent a mechanical contact with the circumference 7090 of the optics barrel component 7060. In the state depicted in FIG. 7, rotational motion bridge piezoelectric actuator 7040 is in the contracted (inactive) state and rotational motion bridge piezoelectric actuator 7080 is in the contracted (inactive) state to produce rotational motion 7020 by optics barrel 7060.

Returning to FIG. 11, group 1 and group 2 locking actuators are placed in a locked state (block 11060). Block 11060 represents the transition from FIG. 7, which is described above, to FIG. 8. Referring briefly to FIG. 8, the first group of locking motion piezoelectric actuators including locking motion piezoelectric actuator 8070a attached to rotational motion bridge piezoelectric actuator 8080 and locking motion piezoelectric actuator 8070c attached to rotational motion bridge piezoelectric actuator 8040 is locked in an extended state to produce a mechanical contact 8075a and 8075c with the circumference 8090 of the optics barrel component 8060.

In the state depicted in FIG. 8, the second group of locking motion piezoelectric actuators includes locking motion piezoelectric actuator 8070b attached to rotational motion bridge piezoelectric actuator 8080 and locking motion piezoelectric actuator 8070d attached to rotational motion bridge piezoelectric actuator 8040 is locked in an extended state to produce a mechanical contact 8075b and 8075d with the circumference 8090 of the optics barrel component 8060. In the state depicted in FIG. 8, rotational motion bridge piezoelectric actuator 8040 is in the contracted (inactive) state and rotational motion bridge piezoelectric actuator 8080 is in the contracted (inactive) state.

Multifunction Device

Figure 12:
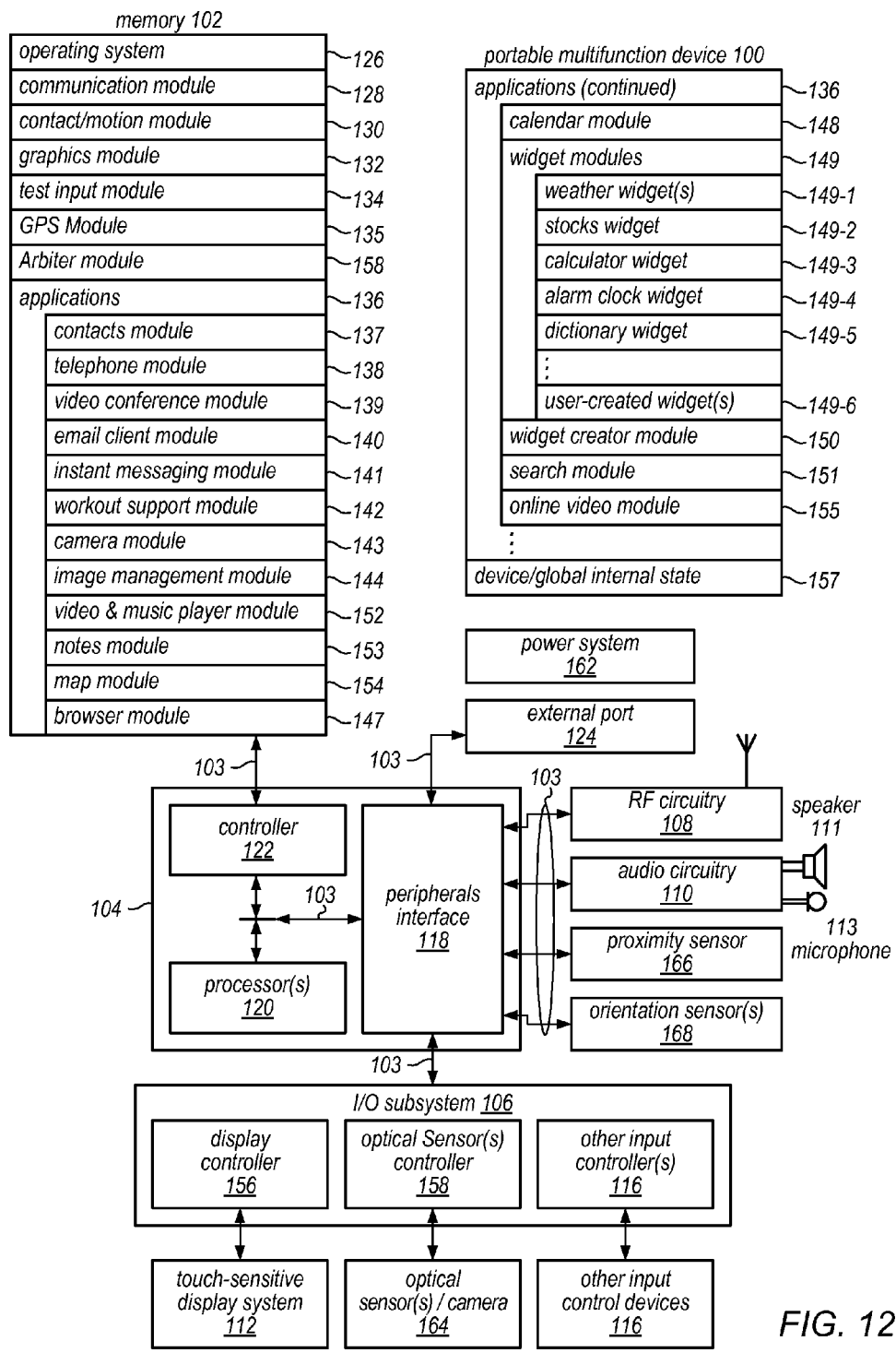
FIG. 12 illustrates a portable multifunction device having a camera in accordance with some embodiments.

FIG. 12 depicts a block diagram of a portable multifunction device with a camera in accordance with some embodiments. Attention is now directed toward embodiments of portable devices with cameras. FIG. 11 is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 13:
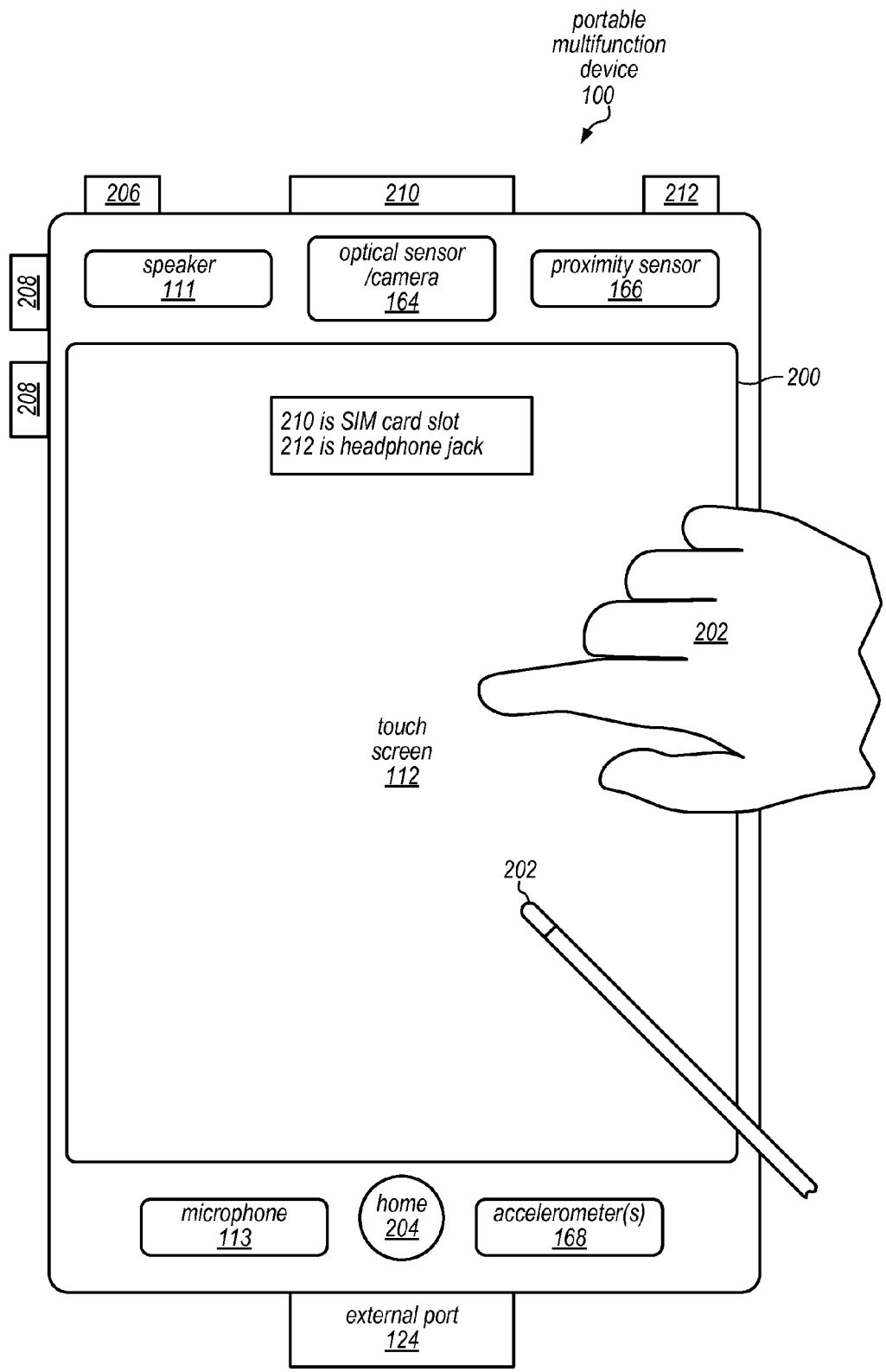
FIG. 13 illustrates a portable multifunction device having a camera in accordance with some embodiments.
Figure 14:
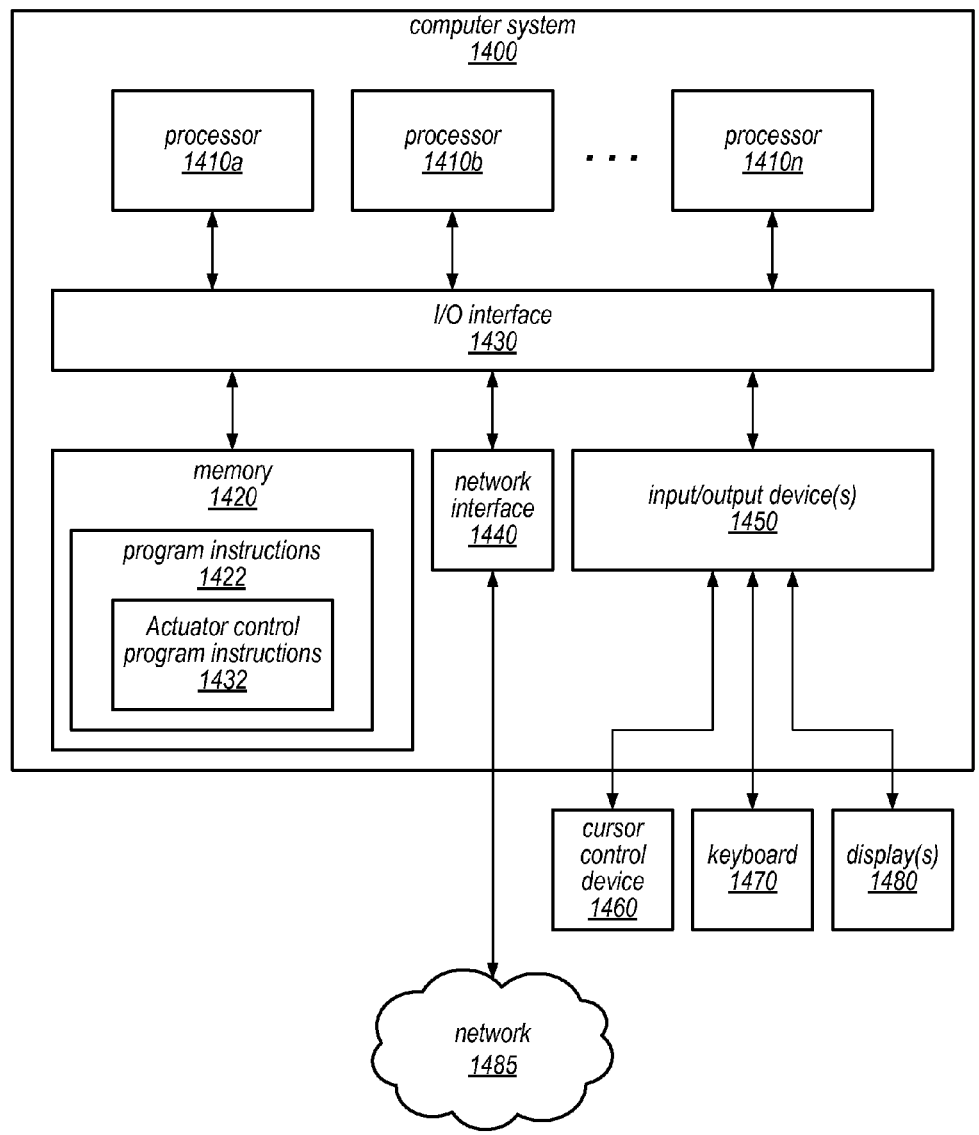
FIG. 14 depicts an example computer system configured to implement aspects of the system and method for camera control, according to some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 13 and 14. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 13 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 (on the front of a device), rear-facing camera or optical sensor that is pointed opposite from the display may be used instead of optical sensor/camera 164.

Example Computer System

FIG. 14 illustrates computer system 1400 that is configured to execute any or all of the embodiments described above. In different embodiments, computer system 1400 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an actuator motion control system as described herein, may be executed in one or more computer systems 1400, which may interact with various other devices. Note that any component, action, or functionality described above with respect to FIGS. 1-20 may be implemented on one or more computers configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments processors 1410 may be general-purpose or embedded processors implementing any of a variety of instruction set architectures (ISAs), such as the x814, PowerPC, SPARC, or MIPS ISAs, or any other suitable ISA. In multiprocessor systems, each of processors 1410 may commonly, but not necessarily, implement the same ISA.

System memory 1420 may be configured to store camera control program instructions 1422 and/or camera control data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions 1422 may be configured to implement a lens control application 1424 incorporating any of the functionality described above. Additionally, existing actuator control data 1432 of memory 1420 may include any of the information or data structures described above. In some embodiments, program instructions and/or data may be received, sent or stored upon different types of computer-accessible media or on similar media separate from system memory 1420 or computer system 1400. While computer system 1400 is described as implementing the functionality of functional blocks of previous Figures, any of the functionality described herein may be implemented via such a computer system.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 (e.g., carrier or agent devices) or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless digital data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1422, which may be processor-executable to implement any element or action described above. In one embodiment, the program instructions may implement the methods described above. In other embodiments, different elements and data may be included. Note that data may include any data or information described above.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A camera component, the camera component comprising:
   an annular lens holder component having a threaded interior surface for translating rotational motion of an optics barrel component into motion along an optical axis of the optics barrel component, wherein
      the threaded interior surface of the lens holder component comprises one or more threads complementary to one or more threads of a threaded exterior surface of an optics barrel component;
   the optics barrel component, wherein
      the optics barrel component is movably mounted on the threads of the threaded interior surface of the lens holder component for rotational motion within the lens holder component, and
      the optics barrel has a threaded exterior surface with one or more threads complementary to the threads of the threaded interior surface of the lens holder component;
   a piezoelectric motor fixedly mounted to a base component, wherein
      the piezoelectric motor comprises
         one or more rotational motion bridge piezoelectric actuators aligned for expansion and contraction along lines tangential to a circumference of the optics barrel component; and
      one or more locking motion piezoelectric actuators aligned for expansion and contraction approximately radial to the circumference of the optics barrel component.

2. The camera component of claim 1, wherein
   the one or more locking motion piezoelectric actuators are mounted at ends of respective ones of the one or more rotational motion bridge piezoelectric actuators.

3. The camera component of claim 1, wherein
   when in an extended state, the one or more locking motion piezoelectric actuators produce a mechanical contact with an the optics barrel component to produce motion in response to expansion or contraction of the rotational motion bridge piezoelectric actuators; and
   when in a contracted state, the one or more locking motion piezoelectric actuators do not make mechanical contact with an the optics barrel component to produce motion in response to expansion or contraction of the rotational motion bridge piezoelectric actuators.

4. The camera component of claim 1, wherein
   the annular lens holder component is fixedly mounted to a base component.

5. The camera component of claim 1, wherein
   the one or more rotational motion bridge piezoelectric actuators aligned for expansion and contraction along lines tangential to a circumference of the optics barrel component further comprise:
      one or more pair of synchronized rotational motion bridge piezoelectric actuators aligned for expansion and contraction along lines tangential to a circumference of the optics barrel component and synchronized for complementary motion to adjust a focal distance of the camera component.

6. The camera component of claim 1, wherein
   the one or more rotational motion bridge piezoelectric actuators aligned for expansion and contraction along lines tangential to a circumference of the optics barrel component further comprise:
      one or more pair of synchronized rotational motion bridge piezoelectric actuators aligned for expansion and contraction along lines tangential to a circumference of the optics barrel component and synchronized for complementary motion to adjust a distance between the optics barrel component and an image sensor component.

7. A rotational motion actuator, comprising:
   an exterior component having a grooved interior surface, wherein
      the exterior component is fixedly mounted to a base component, and
      the grooved interior surface of the exterior component comprises one or more grooves complementary to one or more tongues of an exterior surface of a barrel component;
   the barrel component, wherein
      the barrel component is movably mounted on the grooves of the grooved interior surface of the exterior component for rotation motion within the exterior component, and
      the barrel component has a tongued exterior surface with tongues complementary to the grooves of the interior surface of the exterior component;
   a linear-motion actuator motor fixedly mounted to the base component, wherein
      the linear-motion actuator motor comprises
         one or more rotational motion linear-motion actuators aligned for expansion and contraction along lines tangential to a circumference of the barrel component; and
   one or more locking motion linear-motion actuators mounted at ends of respective ones of the one or more rotational motion bridge linear-motion actuators.

8. The rotational motion actuator of claim 7, wherein
   the one or more locking motion linear-motion actuators mounted at ends of respective ones of the one or more rotational motion bridge linear-motion actuators are each aligned transverse to an axis of expansion and contraction of a respective one of the rotational motion linear-motion actuators.

9. The rotational motion actuator of claim 8, wherein
when in an extended state, the one or more locking motion linear-motion actuators produce a mechanical contact with an the barrel component to produce motion in response to expansion or contraction of the rotational motion bridge linear-motion actuators.

10. The rotational motion actuator of claim 9, wherein
when in a contracted state, the one or more locking motion linear-motion actuators do not make mechanical contact with an the optics barrel component to produce motion in response to expansion or contraction of the rotational motion bridge linear-motion actuators.

11. The rotational motion actuator of claim 7, wherein
the linear-motion actuator motor further comprises one or more piezoelectric actuators.

12. The rotational motion actuator of claim 7, wherein
the linear-motion actuator motor further comprises one or more electromagnetic actuators.

13. The rotational motion actuator of claim 7, wherein
the linear-motion actuator motor further comprises one or more thermoplastic linear actuators.

14. A method of controlling the motion of a camera component, comprising:
producing a mechanical contact between one or more locking motion piezoelectric actuators and an optics barrel component by placing in an extended state the one or more locking motion piezoelectric actuators in preparation to produce motion in response to expansion or contraction of one or more rotational motion bridge piezoelectric actuators;
expanding or contracting the one or more rotational motion bridge piezoelectric actuators, wherein
the one or more rotational motion bridge piezoelectric actuators are aligned for expansion and contraction along lines tangential to a circumference of the optics barrel component; and
eliminating the mechanical contact between one or more locking motion piezoelectric actuators and the optics barrel component by placing the one or more locking motion piezoelectric actuators in a contracted state.

15. The method of claim 14, wherein
in the contracted state, the one or more locking motion piezoelectric actuators do not make mechanical contact with an the optics barrel component to produce motion in response to expansion or contraction of the rotational motion bridge piezoelectric actuators.

16. The method of claim 14, further comprising:
translating rotational motion of the optics barrel component into motion along an optical axis of the optics barrel component by rotating the optics barrel component within a movable mount mounted on threads of a threaded interior surface of a lens holder component.

17. The method of claim 14, wherein
the producing a mechanical contact between one or more locking motion piezoelectric actuators and an optics barrel component by placing in an extended state the one or more locking motion piezoelectric actuators further comprises
extending one or more locking motion linear-motion actuators mounted at ends of respective ones of the one or more rotational motion bridge linear-motion actuators that are each aligned transverse to an axis of expansion and contraction of a respective one of the rotational motion bridge piezoelectric actuators.

18. The method of claim 14, wherein
the producing a mechanical contact between one or more locking motion piezoelectric actuators and an optics barrel component by placing in an extended state the one or more locking motion piezoelectric actuators further comprises
placing in an extended state the one or more complementary pair of locking motion piezoelectric actuators.

* * * * *